United States Patent [19]
Cummins

[11] 3,762,478
[45] Oct. 2, 1973

[54] REMOTE CONTROLLED HAZARD-FIGHTING VEHICLE

[76] Inventor: Phil F. Cummins, 2831 Fifth Ave., Fort Worth, Tex.

[22] Filed: Mar. 8, 1972

[21] Appl. No.: 232,842

[52] U.S. Cl. .................................. 169/24, 169/25
[51] Int. Cl. ............................................ A62c 27/00
[58] Field of Search ...................... 239/172; 169/24, 169/25; 180/6.7

[56] References Cited
UNITED STATES PATENTS

| 2,834,416 | 5/1958 | Becker | 169/25 |
| 3,169,581 | 2/1965 | Cummins | 169/24 |
| 3,363,362 | 1/1968 | Jolley | 180/6.7 X |
| 3,010,519 | 11/1961 | Gillespie | 169/25 |
| 3,322,350 | 5/1967 | Heinicke et al | 239/172 |

FOREIGN PATENTS OR APPLICATIONS

| 1,191,449 | 5/1970 | Great Britain | 169/24 |
| 1,172,580 | 6/1964 | Germany | 180/6.7 |

Primary Examiner—M. Henson Wood, Jr.
Assistant Examiner—John J. Love
Attorney—D. Carl Richards et al.

[57] ABSTRACT

The specification discloses a remote controlled hazard-fighting vehicle including a chassis having crawler tracks mounted on opposite sides thereof. Motors are mounted within the chassis for independently advancing the crawler tracks. A movable turret is mounted on the upper part of the chassis and includes a movable nozzle for being attached through a flexible hose to a source of pressurized fluid. A portable transmitter is provided to selectively generate a plurality of unique tone signal combinations. A receiver is mounted within the chassis for receiving the tone signal combinations, and circuitry within the chassis is responsive to the output of the receiver in order to control the advancement of the crawler tracks and the movement of the turret and nozzle.

17 Claims, 8 Drawing Figures

REMOTE CONTROLLED HAZARD-FIGHTING VEHICLE

FIELD OF THE INVENTION

This invention relates to hazard-fighting devices, and more particularly relates to a remote controlled fire-fighting vehicle.

THE PRIOR ART

A wide variety of hazard-fighting devices have been heretofore proposed for containing fires and the like in petrochemical plants, oil refineries, air terminals, forests, ammunition manufacturing plants, and various other industry and municipality environments. For example, U. S. Pat. No. 3,169,581, entitled "Fire Fighting and Rescue Apparatus," issued Feb. 16, 1965, to the present applicant, discloses the use of a plurality of vehicles operated through cables for applying various fire-fighting agents to fires. It has been found that the use of such cables presents problems because of the vulnerability of the cables to fouling or to severance by the vehicle wheels and protuberances from the ground. In addition, the use of such cables limits the distance which an operator may stand away from the fire or other catastrophe. Moreover, prior art fire-fighting devices have not been sufficiently versatile or reliable for widespread practical use for hazard-fighting applications. A need has thus arisen for a rugged remote controlled hazard-fighting vehicle which may be directed into close proximity of a fire or other catastrophe without being hampered by ice, boggy ground, high winds, ground embankments, radiation, intense heat, noxious or chemical fumes, hostile crowds, or the danger of explosions.

SUMMARY OF THE INVENTION

In accordance with the present invention, a remote controlled hazard-fighting vehicle is operated by radio control by an operator standing a distance away from the site of operation of the vehicle. The vehicle is provided with a massive low profile construction and may be operated with great reliability due to its construction. The vehicle may be remotely directed into the very heart of a holocaust, carrying and using a wide variety of hazard-fighting equipment. The vehicle can be operated to load and unload itself from a trailer and utilizes a specialized radio control system which is not subject to outside interference. Due to the specialized radio control system, a plurality of identical remote controlled vehicles may be operated in the same area without interference in the individual commands for the vehicles. When used to direct streams of fire-fighting agents, such as wet agent or dry powder, the vehicle may be remotely controlled to very accurately direct high pressure streams to any particular location desired. Different fire-fighting agents such as water, foam or chemicals may be used singularly or simultaneously with the invention.

In accordance with a more specific aspect of the invention, a remote controlled vehicle includes a chassis having crawler tracks mounted on opposite sides thereof. Motors are mounted within the chassis for advancing the crawler tracks. A nozzle is mounted on the chassis for directing a stream of fluid therefrom. A portable radio transmitter is provided to generate a plurality of unique tone signal combinations. A radio receiver is mounted in the chassis for controlling the operation of the motors in response to the tone signal combinations.

In accordance with another aspect of the invention, a remote controlled fire-fighting vehicle includes a chassis having crawler tracks mounted on opposite sides. Electric motors within the chassis are provided to independently advance the tracks. A movable turret is mounted on the upper portion of the chassis and includes nozzle structure for being attached through a hose to a source of pressurized fire-fighting agent. A portable transmitter is provided to selectively generate a plurality of unique tone signal combinations. A receiver within the chassis receives the tone signal combination and controls the advancement of the tracks and the movement of the turret.

In accordance with yet a more specific aspect of the invention, a remote controlled fire-fighting vehicle is provided which includes a fire resistant chassis. Crawler tracks are mounted on opposite sides of the chassis and are movable by drive wheels. First and second electric motors are mounted within the chassis, with a gear reduction box being connected between each of the motors and the drive wheels for the crawler tracks. A turret is pivotally mounted on the top of the chassis. A third electric motor is connected to pivot the turret. A nozzle is carried by the turret and is movable between raised and lowered positions and is adapted to be connected to a hose. A fourth electric motor is operable to raise and lower the nozzle. Batteries are mounted within the chassis and are connected through switches to the motors. A portable transmitter case includes a plurality of keys operable by the vehicle operator. Circuitry within the case generates a unique tone sequence combination upon actuation of each key. A receiver within the chassis actuates selected switches in response to reception of the tone signal combinations, wherein the chassis may be selectively transported to a desired location and the nozzle moved to selectively direct a high pressure stream of fire-fighting agent.

DESCRIPTION OF THE DRAWINGS

For a more complete understanding of the present invention, and for further objects and advantages thereof, reference is now made to the following description taken in conjunction with the accompanying drawings, in which.

DESCRIPTION OF THE PREFERRED EMBODIMENT

Figure 1:
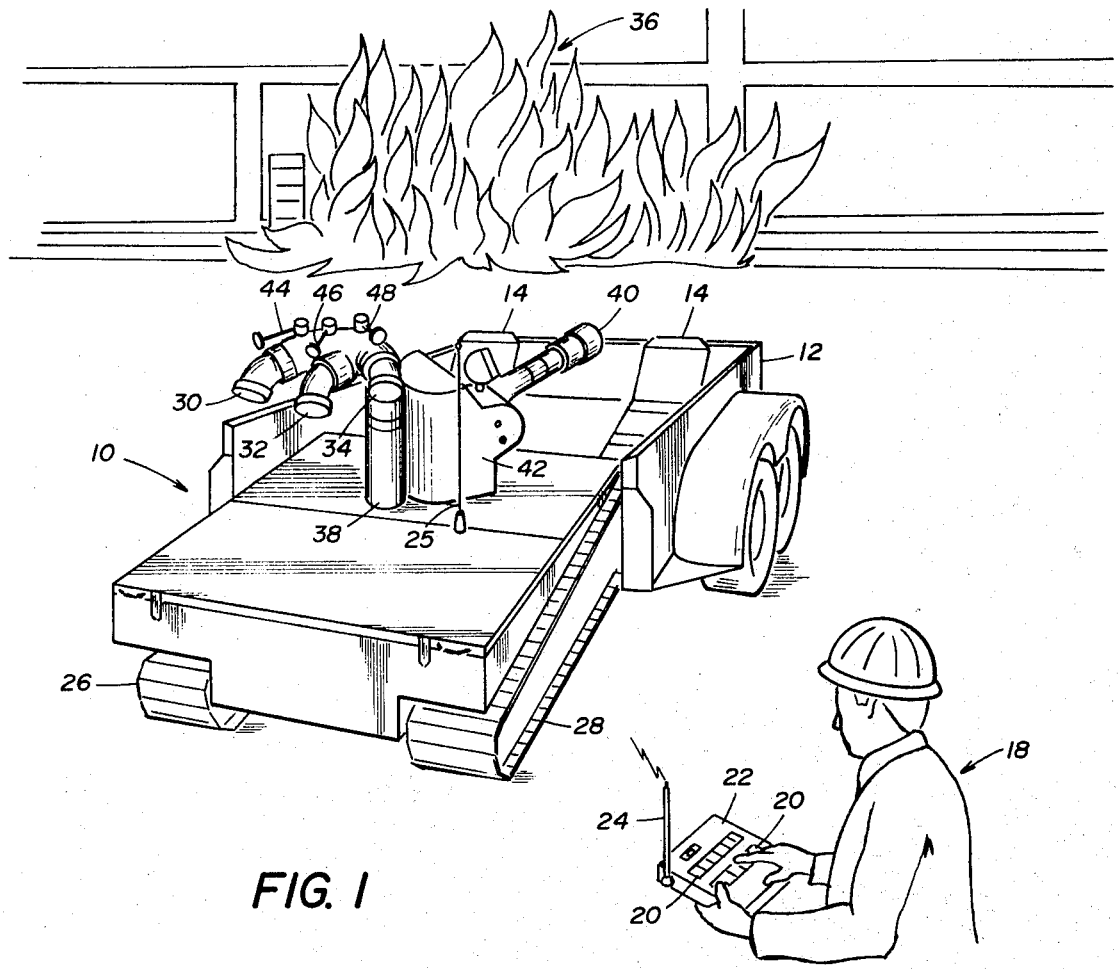
FIG. 1 is a somewhat diagrammatic perspective view of the remote controlled vehicle during an unloading operation.

Referring to FIG. 1, a somewhat diagrammatic view is illustrated of the initial unloading operation of the remote controlled vehicle 10 at the scene of a fire. The vehicle 10 has previously been towed to the scene of the fire in a trailer 12. Track guides 14 are provided in the trailer 12 for support of the vehicle 10. The trailer 12 is tilted down, and an operator 18 depresses buttons 20 on a portable radio transmitter casing 22. Coded tone sequences are then transmitted from an antenna 24 to an antenna 25 mounted on the vehicle 10, and the signals are detected by a receiver within the vehicle 10. The tone signals control the operation of electrical motors within the vehicle 10, to be subsequently described, to cause the crawler tracks 26 and 28 of the vehicle to advance in the reverse direction so that the vehicle 10 is automatically unloaded from the trailer 12.

Figure 2:
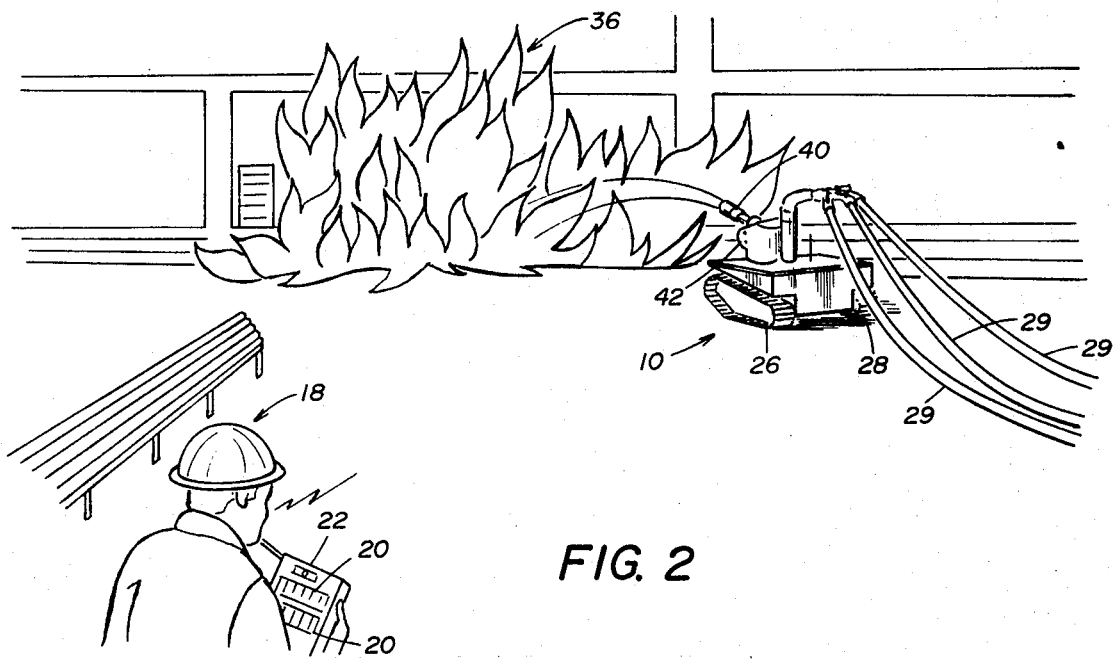
FIG. 2 is a somewhat diagrammatic perspective view of the present vehicle during a fire-fighting operation.

After unloading of the vehicle 10, high pressure hoses 29 (FIG. 2) are attached to threaded pipe connectors 30, 32 and 34. As shown in FIG. 2, the vehicle 10 may then be directed toward a fire 36 or other catastrophe by proper operation of the buttons 20 by the operator 18. Pressurized fire-fighting fluid such as water, chemicals, powder or the like may then be directed through the hoses 29 and through a vertical boom 38. The boom 38 is connected to a nozzle 40 mounted on a pivotable turret 42 on the vehicle 10. Valves 44, 46 and 48 may be selectively operated in order to control the type and amount of fire-fighting agent directed from the nozzle 40.

As will be subsequently described, suitable motors within the vehicle 10 control the pivotal movement of the turret 42 and vertical movement of the nozzle 40 in order that a pressurized stream of fire-fighting fluid may be very accurately directed against the fire 36. The movement of the turret 42 and nozzle 40 is controlled by proper operation of buttons 20 by the operator 18. In addition, the nozzle 40 may be selectively fanned in and out in order to control the area covered by the stream of fluid directed from the nozzle 40.

Figure 3:
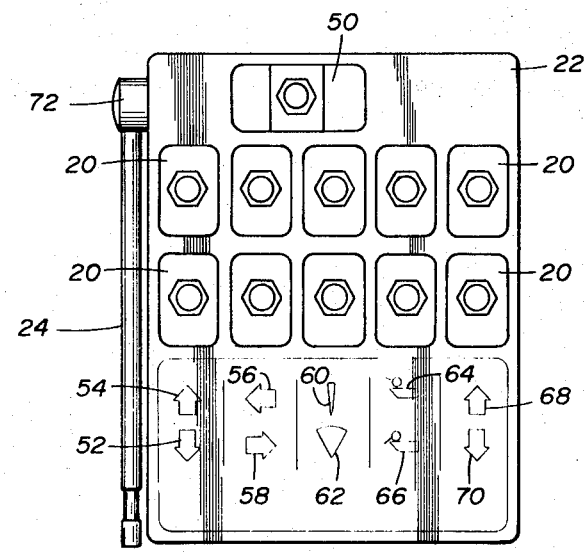
FIG. 3 is a top view of the portable transmitter of the invention.

FIG. 3 illustrates in greater detail the portable transmitter casing 22 which may be selectively operated by the operator 18 to transmit tone control signals for operation of the vehicle 10. In the preferred embodiment, the casing 22 comprises a pair of mating aluminum halves which are mounted together by suitable gaskets to provide a watertight housing. Pushbuttons or keys 20 are disposed in the central portion of the casing 22 and an on-off pushbutton 50 is located in the upper portion of the casing. The pushbuttons are preferably of the spring loaded type. Legends corresponding to each of the buttons are located in the lower portion of the casing 22. For example, legend 52 indicates that the corresponding button causes the left vehicle track to advance in the reverse direction, while legend 54 indicates that depression of the corresponding button will cause the left vehicle crawler track to advance in the forward direction.

The button corresponding to legend 56 causes the turret 42 to pivot to the left, while the button corresponding to legend 58 causes the turret to pivot the right. The button corresponding to legend 60 causes the nozzle 40 to fan inwardly, while the button corresponding to legend 62 causes the nozzle to fan outwardly. The button corresponding to legend 64 causes the nozzle 40 to be raised, while the button corresponding to legend 66 causes the nozzle to be lowered. Depression of the button corresponding to legend 68 causes the forward advancement of the right-hand crawler track, while the button corresponding to legend 70 causes the right-hand crawler track to be advanced in the reverse direction. Button 50 must be depressed prior to the actuation of any of the buttons 20. The antenna 24 is pivoted to the casing 22 at the member 72 to provide ease of storage.

Figure 4:
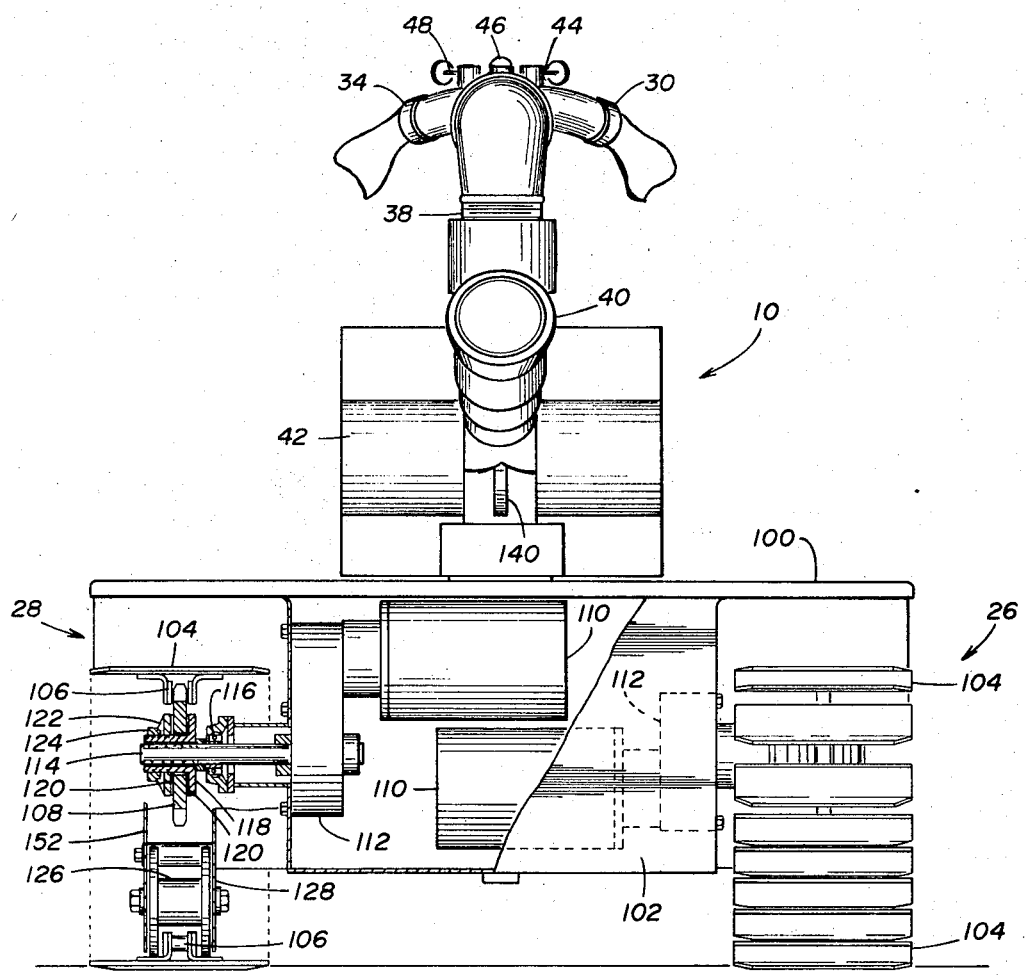
FIG. 4 is a front view, partially broken away, of the vehicle.

FIG. 4 illustrates a front view of the vehicle 10 with a portion of the lower housing broken away to illustrate the motor and track construction. As shown in FIGS. 1, 2 and 4, the vehicle 10 includes a chassis having an upper housing 100 and a lower housing 102 having a width less than the width of the upper housing 100. Crawler tracks 26 and 28 are mounted underneath the overhang of the upper housing 100. The upper housing 100 has a triangular cross section with the apex of the triangle directed forwardly.

Referring to FIG. 4, it will be seen that the crawler tracks comprise a plurality of grousers 104 mounted on drive chain 106. The drive chains 106 are advanced by movement of the drive sprocket 108. Rotation is provided to the sprocket 108 by operation of an electrical drive motor 110, which in the preferred embodiment comprises a 2 and ½ horsepower electrical reversible motor having an output in the range of 2800 rpm. The output of the motor 110 is directed through a 16:1 gear reduction box 112 which rotates a drive shaft 114. A bearing support 116 supports the shaft 114. A slip clutch 118 is disposed between the sprocket 108 and the shaft 114. Friction pads 120 are disposed between the slip clutch 118 and the sprocket 108, and a spring 122 maintains tension on the friction pads. A tightening nut 124 enables the tension on the slip clutch to be adjusted. The slip clutch arrangement is important to protect the drive system in case the crawler track is hung up or stopped by an object. A plurality of bogie wheels 126 guide the drive chain 106. The bogie wheels are pivotally supported between frame 128 and plate 152 connected to the chassis of the lower housing 102.

As also shown in FIG. 4, a gear 140 is operable by an electrical motor, to be subsequently described, in order to raise and lower the nozzle 40. The quick opening valves 44–48 enable variance of the amount of fluid dispensed from the nozzle 40. For example, in the preferred embodiment, opening of only one of the valves provides an output of 250 gallons per minute from the nozzle. Opening of a second valve provides an output of 700 gallons per minute, while opening of all three of the valves provides an output of 1200 gallons per minute from the nozzle 40.

Figure 5:
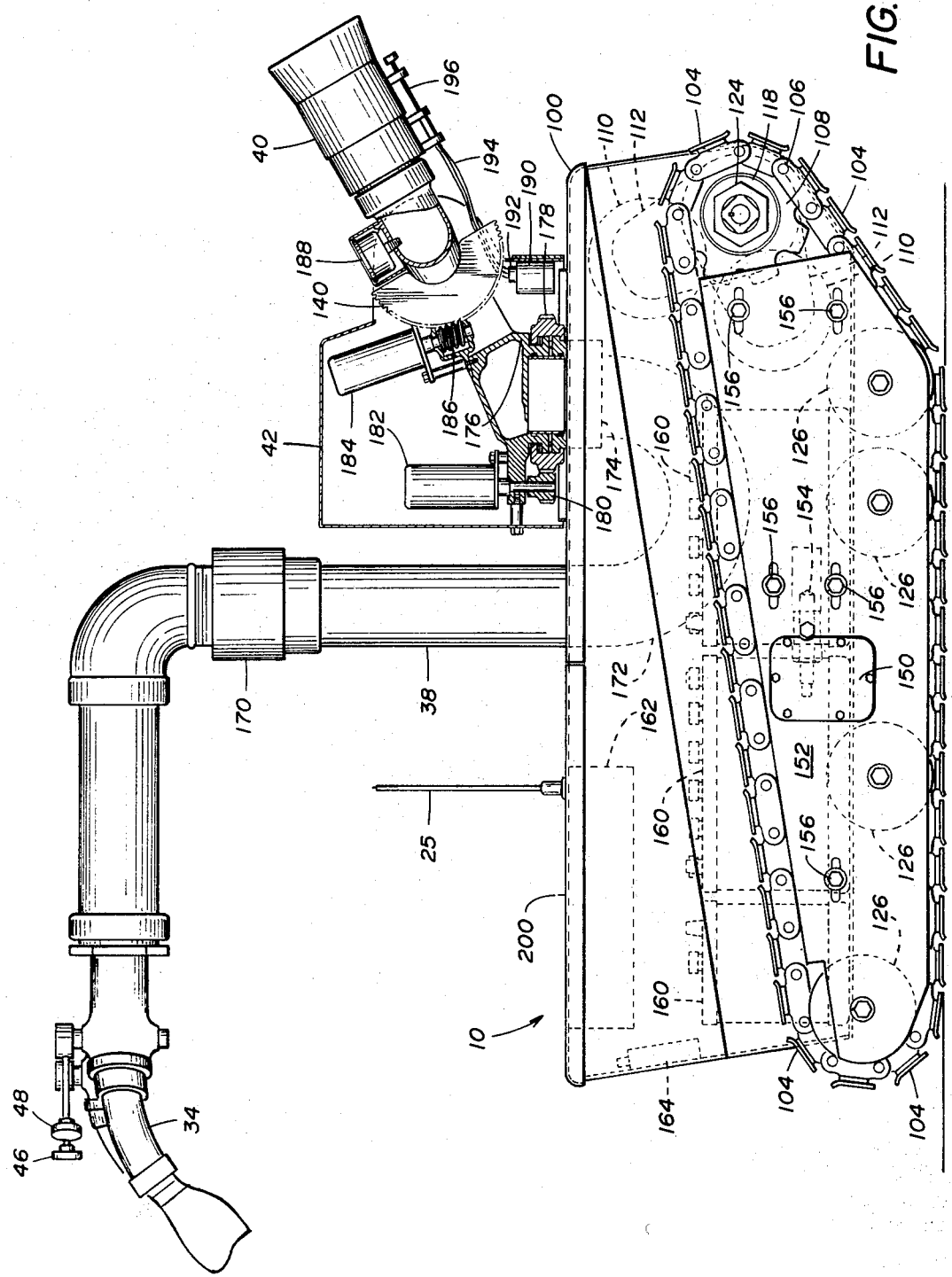
FIG. 5 is a side view, partially broken away, of the vehicle.

FIG. 5 illustrates a side view of the vehicle 10 with like numerals being utilized for like and corresponding parts shown in the previous drawings. The turret 42 is sectioned in order to illustrate the various electrical motors therein. This figure illustrates the placement of the bogie wheels 126 which guide the drive chain 106 and the grousers 104. The triangular cross section of the upper housing 100 enables the forward portion of the crawler tracks to be raised so that the vehicle 10 can negotiate substantial grades up to 60° and can move over obstacles of substantial size. Tightening nut 124, along with the slip clutch 118, are shown mounted to the drive sprocket 108.

A door 150 is provided in the outer plate 152 which covers the interior of the crawler track mechanism. The opening of the door 150 provides access to a tightener nut 154 which may be loosened and retightened in order to tighten the crawler track chain 106. Bolts 156 are disposed through elongated holes in the plate 152. When the tightener nut 154 is loosened along with the bolts 156, the plate 152 may be moved relative to the chassis 102 in order to adjust the tension on the drive chain 106.

Power for operation of the motors 110 is provided by a plurality of automotive storage batteries 160 which are mounted within the chassis of the vehicle 10. The radio receiver 162 is also mounted in the chassis, along with electrical relay switches 164. As will be subsequently described, receiver 162 receives coded tone sequences via the antenna 25 and controls the operation of ones of the relay switches 164. Electrical power is then supplied through the energized switches 164 to operate the electrical motors in the desired manner.

FIG. 5 also illustrates the structure of the boom 38 which is attached at the upper end thereof to a boom swivel member 170. The upper portion of the boom includes a horizontal bend for connection with the three hose connectors 30–34 in the manner previously described. An important aspect of the present invention is the provision of a generally U-shaped lower extension 172 which provides fluid to the nozzle 40 with a minimum of fluid resistance. Extension 172 opens into a stationary annular housing 174 which is sealingly mated with a pivotal housing 176. Housing 176 is rigidly connected to an annular cog gear 178 which is driven by a drive sprocket 180.

Sprocket 180 is connected to the output shaft of a reversible electrical drive motor 182. Operation of suitable relay switches 164 of radio receiver 162 causes the motor 182 to rotate the sprocket 180 and the gear 178 in order to selectively pivot the turret housing 42. Mounted on the upper portion of the housing 176 is an electrical motor 184 which rotates a worm gear 186. Gear 186 meshes with the cog gear 140 previously described which is rigidly attached to the nozzle 40. Operation of the motor 184 by energization of suitable relay switches 164 by the receiver 162 thus causes the nozzle 40 to be selectively raised or lowered. A pressure gauge 188 is provided on the nozzle 40 to enable visual indication of the flow through the nozzle. Another electrical motor 190 is attached to the turret housing and includes an output groove gear 192 which pushes a flexible rod through an armored hose 194. The rod 196 is connected at the upper end to the fanable nozzle 40. When the nozzle 40 is pulled inwardly by the rod 196, the fluid stream emanating from the nozzle is fanned, while when the rod 196 pushes the nozzle outwardly, a generally straight fluid stream is provided from the nozzle 40.

Figure 6:
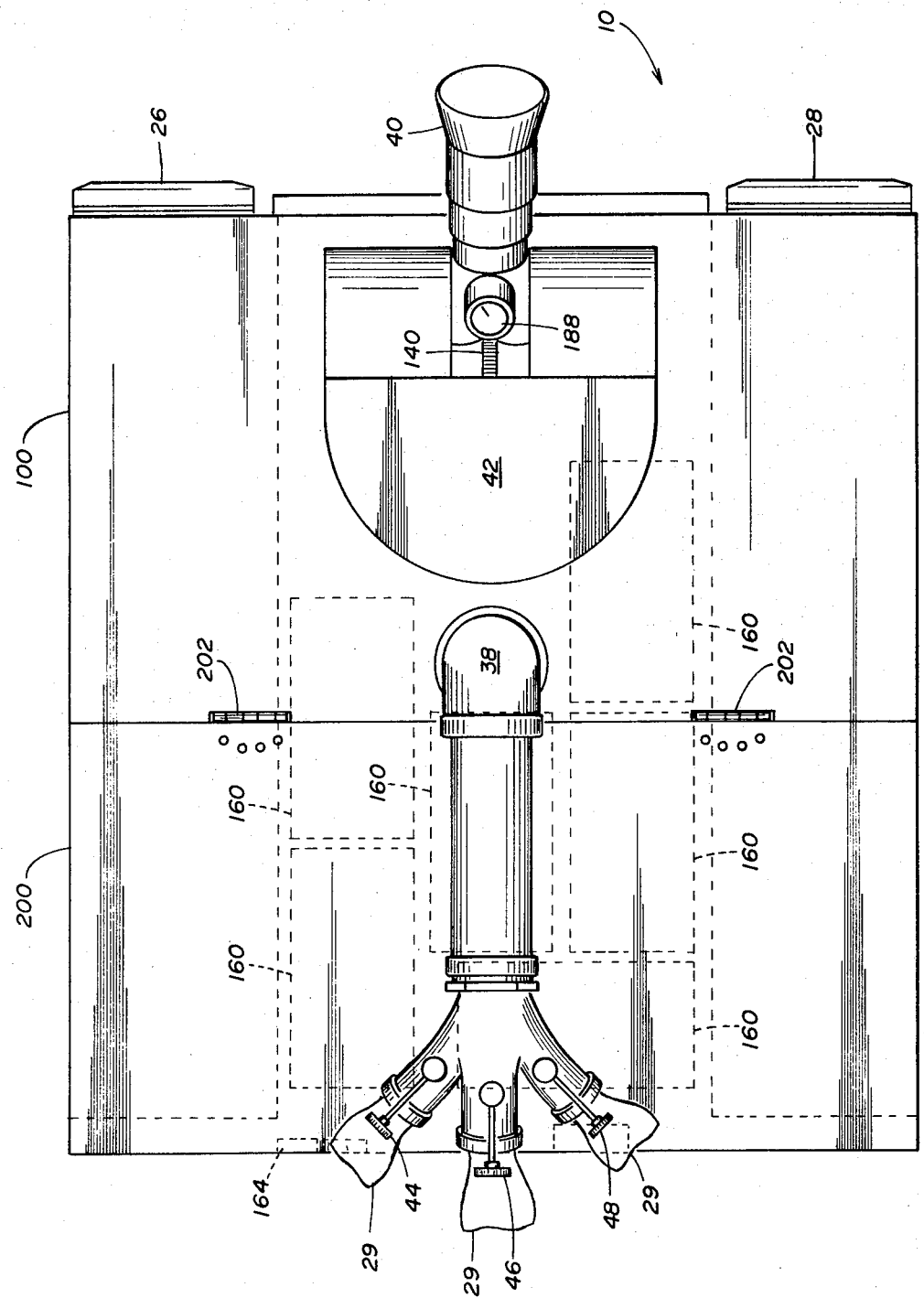
FIG. 6 is a top view of the vehicle.

FIG. 6 illustrates a top view of the vehicle 10. An important aspect of the invention is that the boom 38 is mounted in the center of the vehicle, thus allowing the turret 42 to rotate in substantially a 360° arc. The rear deck of the housing 100 of the vehicle 10 includes a cover 200 pivotally connected at one end by hinges 202. Cover 200 may thus be raised for maintenance and for recharging of the batteries. As may be seen, six 12-volt automotive batteries 160 are disposed within the chassis of the vehicle 10. The batteries are interconnected through the relay switches 164 previously described to the various motors of the vehicle. An important aspect of the invention is that the cover 200 and the entire chassis of the vehicle 10 is waterproof and is also fire resistant. The generally low profile construction of the vehicle 10 provides excellent traction and enables heavy hoses 29 to be pulled for long distances.

Figure 7:
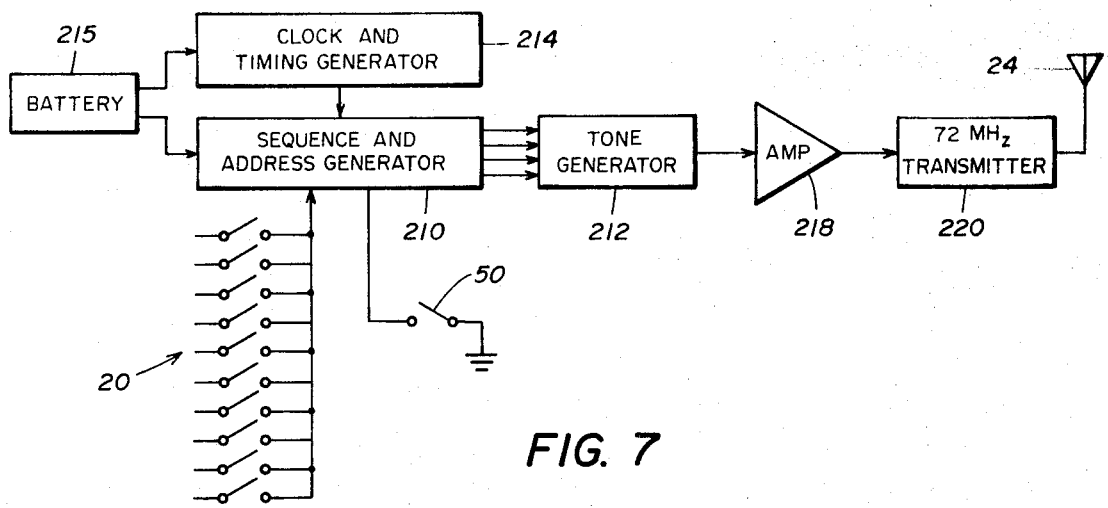
FIG. 7 is an electrical block diagram of the transmitter of the invention.

FIG. 7 is a block diagram of the circuitry within the portable transmitter casing 22. The function buttons 20 may be individually operated by the operator 18. Depression of one of the function buttons operates the sequence and address generator 210 to apply timed control signals for operation of four tone generators 212. A clock and timing generator 214 controls the timing sequence of the generator 210. Power for the system is provided by a rechargeable battery 215. In the preferred embodiment, the sequence and address generator 210 comprises an electrical matrix which generates a unique sequence of timed control signals upon depression of each of the function buttons 20. Operation of the eleventh on-off button 50 causes generator 210 to transmit a unique tone combination sequence which is required to turn on the electrical circuits at the remote controlled vehicle 10. The four tone generators 212 are thus sequentially operated to generate tone signals which are amplified through an audio amplifier 218 and are transmitted via a 72 MHZ transmitter 220 through the antenna 24.

Upon depression of one of the function buttons 20, a unique sequence of tones, called a command frame, is generated from the tone generators 212. The command frame is repeatedly transmitted under the control of the clock and timing generator 214 at a rate of six frames per second. Each command frame is subdivided into eight time intervals denoted as time slots. One tone out of the four possible tones generated by the tone generators 212 appears in each time slot. The first three time slots are allocated to the system address which is predetermined by connections within the address generator 210. This system address consists of a particular sequence of three tones in these first three time slots. Due to the fact that any of four tones may be generated in each time slot, a total capability of 57 unique tone addresses exist per radio channel. Thus, by assigning different addresses to different vehicles to be used in the same area, each of the vehicles may be used without fear of radio interference between the units. An important aspect of the invention is that five simultaneous commands may be executed by the operator by simultaneous depression of buttons on the transmitter casing 22.

A suitable transmitter for use with the present device is manufactured and sold by the Motorola Company as the 10–5p.r.c. transmitter/receiver system.

In the preferred embodiment, the transmitter shown in FIG. 7 is provided with a power output of 100mw, with a frequency stability of 0.005 per cent. A battery life of approximately 20 hours may be provided with a mercury battery. In the preferred embodiment, the casing 22 is provided with a weight of approximately six pounds and has dimensions of approximately 8 X 6 ½ X 2 ¼ inches. The present transmitter may be used at ranges up to 1500 feet. Although the transmitter has been described with respect to the preferred embodiment, it will be understood that various other circuitry could be utilized to provide unique sequences of tone combinations for control of the remote vehicle.

Figure 8:
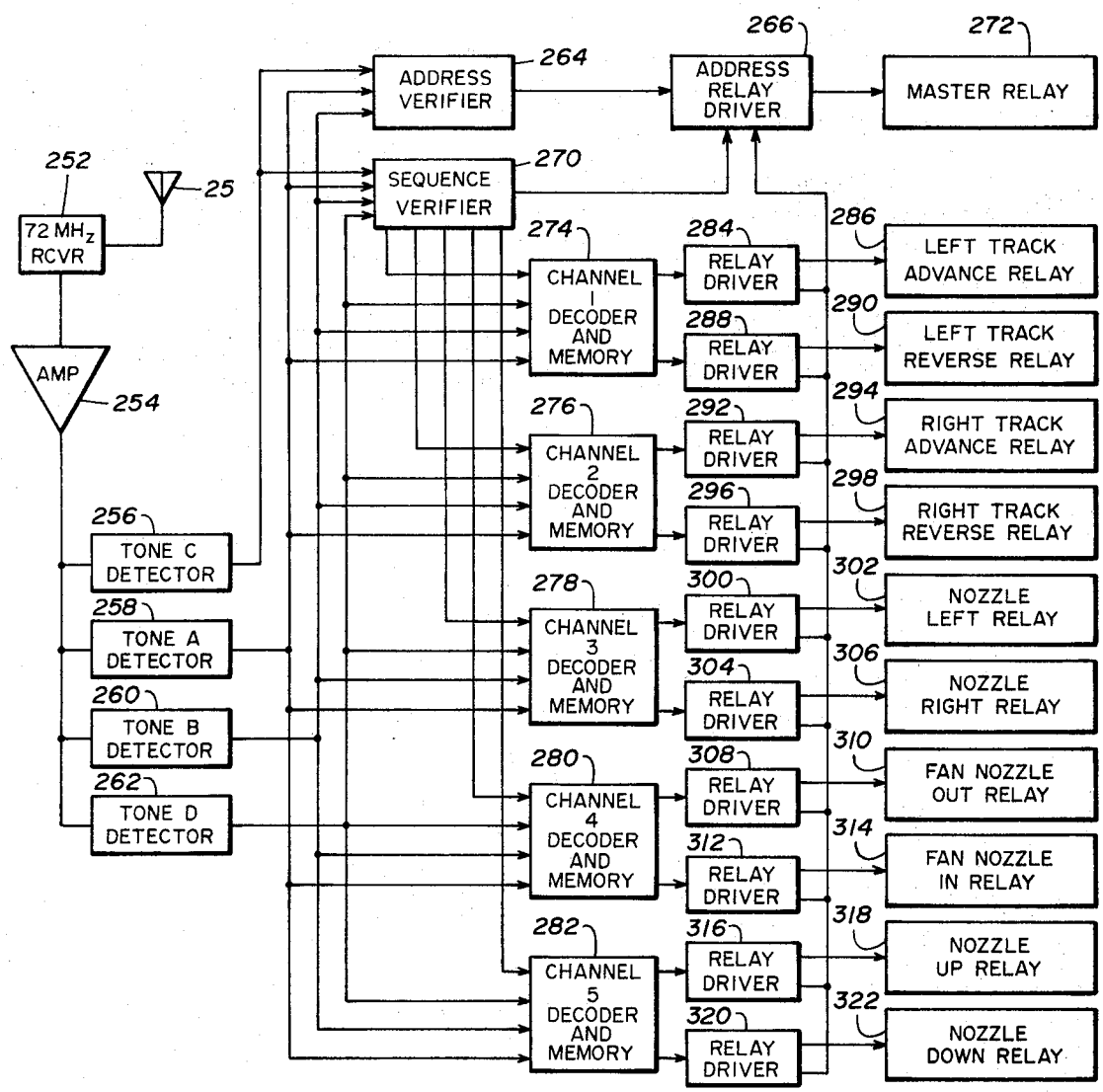
FIG. 8 is an electrical block diagram of the receiver of the invention.

FIG. 8 illustrates a block diagram of the receiver circuitry. The antenna 25 mounted within the chassis of the vehicle 10 senses the coded signals transmitted from the transmitter casing 22 and passes the signals through a 72 MHZ receiver 252. The modulated tones are applied through an audio amplifier 254 and are simultaneously applied through four tuned tone detectors 256-262. Each of the detectors 256-262 detects only one of the four tones generated by the tone generators 212 at the transmitter. The outputs of the detectors 256-262 are applied to an address verifier circuit 264, which generates an enable signal only when the proper address tones have been received thereby.

The enable signal operates an address relay driver circuit 266 which energizes a system valid command relay 268 which allows operation of the remaining relay circuits of the invention. In case the proper address is not received, none of the remaining control relays of the system may be operated. The outputs of the detectors 256-262 are applied to the sequence verifier 270 which generates an enable signal to the driver 266 only when the proper sequence of tones has been received. The driver 266 must receive enable signals from both verifiers 264 and 270 in order to energize the relay 268.

The four outputs of the detectors 256-262 are applied to five channels of decoders and memory circuits 274-282. Each of the decoder circuits 274-282 is capable of generating two outputs. Each of the outputs is a mutually exclusive pair, so that the system is capable of providing ten control functions arranged in five mutually exclusive pairs or five on-off-neutral control functions. For example, the decoder and memory circuit 274 is configured to detect a particular unique tone sequence for generation of an output signal to energize a relay driver 284 which energizes the Left Track Advance relay 286. Energization of relay 286 causes power to be applied to the electrical motor which operates the left hand crawler tracks in the forward direction. The output of the relay driver 284 is also applied as an inhibit signal to the driver 266 to inhibit the driver in case of a short circuit.

The decoder and memory 274 is configured also to detect the mutually exclusive sequence of tones to operate the relay driver 288 to energize the Left Track Reverse relay 290 to drive the left crawler track in the reverse. In a similar manner, the decoder and memory 276 is operable to detect unique tone sequences for operation of either the relay driver 292 for energization of the Right Track Advance relay 294 or to energize the relay driver 296 for energization of the Right Track Reverse relay 298. The decoder and memory 278 is operable to operate the relay driver 300 and the Nozzle Left relay 302. The decoder and memory 278 is also operable to sense a unique tone combination for operation of the relay driver 304 for energizing the Nozzle Right relay 306.

The decoder and memory 280 is operable to energize the relay driver 308 and the Fan Nozzle Out relay 310, or to operate the relay driver 312 to energize the Fan Nozzle In relay 314. Similarly, the decoder and memory 282 is operable to energize the relay driver 316 and the Nozzle Up relay 318, or the relay driver 320 to energize the Nozzle Down relay 322. It will thus be seen that reception of a unique coded combination by the receiver results in the generation of a control signal for operation of a relay to perform a desired control function. Each of the relays 284-322 provides electrical power to operate one of the five motors previously noted. While only single relays 284-322 have been disclosed, in some embodiments a pair of light and heavy relays may be required to operate in series to properly operate the motors of the vehicle 10.

The receiver of the invention in the preferred embodiment is provided with a sensitivity of 0.35 uv for 20 dpq, and has a selectivity of −50 bd at ±20 kc. The receiver has a modulation acceptance of ±5 kc and a stability of ±0.0015 per cent. The solid state output of the receiver in the preferred embodiment is 24 volts maximum at 0.5 amps maximum.

While the preferred embodiment of the invention utilizes the above-described radio control, a cable may be used to transmit signals from the transmitter to the receiver in case of failure of the radio system.

It will thus be seen that the present invention provides a remote controlled hazard-fighting vehicle which may be operated by an operator standing at a substantial distance from the site of operation of the vehicle. The vehicle is extremely rugged in construction and may carry multiple pressurized hoses into the very heart of a holocaust. The vehicle may be remotely operated by an operator to very accurately direct a stream of fire-fighting fluid in any direction. Due to the use of unique tone combination sequences for control of the vehicle, unique addresses may be provided for a plurality of fire-fighting devices such that the devices may be operated in the same area without problems of interference.

Whereas the present invention has been described with respect to specific embodiments thereof, it will be understood that various changes and modifications will be suggested to one skilled in the art, and it is intended to encompass such changes and modifications as fall with the scope of the appended claims.

What is claimed is:

1. A remote controlled vehicle comprising:
   a chassis having crawler tracks mounted on opposite sides thereof,
   motor means mounted within said chassis for advancing said crawler tracks,
   nozzle structure on said chassis for directing a stream of fluid,
   a portable radio transmitter for generating a plurality of unique tone signal combinations having a plurality of time slots,
   means in said transmitter for generating predetermined tones during a portion of said time slots to provide a system address,
   means in said transmitter for generating tones during the remainder of said time slots to provide various function commands for said vehicle, and
   radio receiver means for controlling the operation of said motor means in response to said tone signal combinations.

2. The remote controlled vehicle of claim 1 and further comprising:
   means for pivoting said nozzle structure in response to the output of said radio receiver means.

3. The remote controlled vehicle of claim 1 and further comprising:
   means for varying the spray characteristics of said nozzle structure in response to the output of said radio receiver means.

4. The remote controlled vehicle of claim 1 wherein a plurality of function commands for said vehicle may be simultaneously transmitted from said radio transmitter.

5. A remote controlled fire-fighting vehicle comprising:

a chassis having crawler tracks mounted on opposite sides, motors within said chassis for independently advancing said tracks, a movable turret mounted on said chassis, nozzle structure on said turret for being attached through a hose to a source of pressurized fire-fighting agent, a portable transmitter including a casing having a plurality of keys for selectively generating a plurality of unique tone signal combinations, a receiver within said chassis for receiving said tone signal combinations, said portable transmitter including one key which must be actuated to energize said receiver prior to further operation of said vehicle, and means responsive to the output of said receiver for controlling the advancement of said tracks and the movement of said turret.

6. The remote controlled fire-fighting vehicle of claim 5 and further comprising:

means for raising and lowering said nozzle structure in response to the output of said receiver.

7. The remote controlled fire-fighting vehicle of claim 5 and further comprising:

means for controlling the degree of fanning of said nozzle structure in response to the output of said receiver.

8. The remote controlled fire-fighting vehicle of claim 5 and further comprising:

a plurality of flexible high pressure hoses being attached to said nozzle structure.

9. The remote controlled fire-fighting vehicle of claim 6 wherein said motors are electrically operated and further comprising:

battery means mounted in said chassis, electrical switches connected between said battery means and said motors, the output of said receiver means being connected to control the operation of said electrical switches to thereby control the operation of said motors.

10. The remote controlled fire-fighting vehicle of claim 9 and further comprising:

electrical motors for rotating said turret and for raising and lowering said nozzle structure, and switches operable in response to the output of said receiver means to control the operation of said electrical motors.

11. The remote controlled fire-fighting vehicle of claim 5 wherein said chassis comprises:

an upper housing having a triangular cross section with the apex directed forwardly, a lower housing having a width less than the width of said upper housing, said crawler tracks being disposed underneath the outer edges of said upper housing and adjacent the sides of said lower housing.

12. A remote controlled fire-fighting vehicle comprising:

a fire-resistant chassis, crawler tracks mounted on opposite sides of said chassis and movable by drive wheels, first and second electric motors mounted within said chassis, a gear reduction box connected between each of said motors and the drive wheels for said crawler tracks, a turret pivotally mounted on the top of said chassis, a third electric motor connected to pivot said turret, a nozzle carried by said turret and movable between raised and lowered positions, said nozzle adapted to be connected to a hose, a fourth electric motor operable to raise and lower said nozzle, batteries mounted within said chassis, switches connected between said batteries and said electric motors, a portable transmitter case including a plurality of keys, circuitry within said case for generating a unique tone signal combination upon actuation of each key, wherein a plurality of function commands for said vehicle may be simultaneously transmitted to said chassis, receiver means in said chassis for actuating selected switches in response to reception of said tone signal combinations, whereby said chassis may be selectively transported to a desired location and said nozzle moved to selectively direct a high pressure stream of fire-fighting agent therefrom.

13. The remote controlled fire-fighting vehicle of claim 12 and further comprising:

means for controlling the fanning of said nozzle in response to the output of said receiver means.

14. The remote controlled fire-fighting vehicle of claim 12 wherein said chassis comprises:

an upper housing having a triangular cross section with the apex directed forwardly, a lower housing having a width less than the width of said upper housing, said crawler tracks being disposed underneath the outer edges of said upper housing and adjacent the sides of said lower housing.

15. The remote controlled fire-fighting vehicle of claim 12 wherein said radio transmitter generates signals having a plurality of time slots, means in said transmitter generating predetermined tones during a portion of said time slots to provide a system address, means in said transmitter generating tones during the remainder of said time slots to provide various function commands for said vehicle.

16. The remote controlled fire-fighting vehicle of claim 12 and further comprising:

a key mounted on said transmitter case which when actuated generates a unique sequence of tone signals for enabling said switches within said chassis.

17. The remote controlled fire-fighting vehicle of claim 12 and further comprising:

a pipe upstanding from said chassis for being connected to a flexible hose and including a generally U-shaped lower extension which connects to said nozzle.

* * * * *